(12) United States Patent
Ishikawa et al.

(10) Patent No.: US 11,398,332 B2
(45) Date of Patent: Jul. 26, 2022

(54) ELECTROMAGNETIC ACTUATOR AND HYDRAULIC PRESSURE ADJUSTMENT MECHANISM

(71) Applicant: MITSUBISHI ELECTRIC CORPORATION, Chiyoda-ku (JP)

(72) Inventors: Shoji Ishikawa, Chiyoda-ku (JP); Toru Ogawa, Chiyoda-ku (JP); Kazumasa Ito, Chiyoda-ku (JP); Ryuichi Takiguchi, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 201 days.

(21) Appl. No.: 16/732,401

(22) Filed: Jan. 2, 2020

(65) Prior Publication Data
US 2020/0143970 A1  May 7, 2020

Related U.S. Application Data

(63) Continuation of application No. PCT/JP2018/012801, filed on Mar. 28, 2018.

(30) Foreign Application Priority Data

Jul. 26, 2017 (JP) .............................. JP2017-144115

(51) Int. Cl.
*F16K 31/08* (2006.01)
*H01F 7/08* (2006.01)
(Continued)

(52) U.S. Cl.
CPC ......... *H01F 7/081* (2013.01); *F15B 13/0402* (2013.01); *F15B 13/0433* (2013.01);
(Continued)

(58) Field of Classification Search
CPC ........... F16K 31/082; Y10T 137/86614; Y10T 137/86622; H01F 7/122; H01F 7/1615
(Continued)

(56) References Cited

U.S. PATENT DOCUMENTS 3,775,714 A * 11/1973 Heuer ...................... H01F 7/18
  335/230
7,717,396 B2 * 5/2010 Graffin .................. H01F 7/0242
  251/65

(Continued)

FOREIGN PATENT DOCUMENTS

EP   1 857 720 A2   11/2007
JP   1-302707 A     12/1989
(Continued)

OTHER PUBLICATIONS

International Search Report dated Jul. 3, 2018 in PCT/JP2018/012801 filed Mar. 28, 2018, 2 pages.

*Primary Examiner* — Matthew W Jellett
(74) *Attorney, Agent, or Firm* — Xsensus LLP

(57) ABSTRACT

To obtain an electromagnetic actuator capable of improving a thrust force of a movable element. Provided is an electromagnetic actuator, including: a stator, which has a first surface at one end in an axial direction and a second surface at another end in the axial direction, and is made of a soft magnetic material having a tubular space formed in the axial direction; and a movable element, which is disposed in the tubular space, and is configured to move along the axial direction, wherein the stator includes: a coil; a core portion; and a protrusion portion, wherein the movable element includes a movable element core made of a soft magnetic material and a permanent magnet, and wherein at least one of a radially inner side and a radially outer side of the permanent magnet is covered by a movable element core.

20 Claims, 7 Drawing Sheets

(51) Int. Cl.
*F15B 13/043* (2006.01)
*H01F 7/02* (2006.01)
*H01F 7/16* (2006.01)
*H01F 27/24* (2006.01)
*H01F 27/28* (2006.01)
*F16K 31/06* (2006.01)
*H01F 7/122* (2006.01)
*F15B 13/04* (2006.01)
*F15B 13/044* (2006.01)

(52) U.S. Cl.
CPC ........ *F16K 31/0675* (2013.01); *F16K 31/082* (2013.01); *H01F 7/02* (2013.01); *H01F 7/122* (2013.01); *H01F 7/16* (2013.01); *H01F 27/24* (2013.01); *H01F 27/28* (2013.01); *F15B 2013/0448* (2013.01); *Y10T 137/86614* (2015.04); *Y10T 137/86622* (2015.04)

(58) Field of Classification Search
USPC .......................................................... 251/65
See application file for complete search history.

(56) References Cited

U.S. PATENT DOCUMENTS

| | | | |
|---|---|---|---|
| 8,960,233 B2* | 2/2015 | Nishinosono | F16K 27/048 137/625.64 |
| 2002/0080531 A1 | 6/2002 | Inoguchi et al. | |
| 2005/0104456 A1 | 5/2005 | Yajima et al. | |
| 2020/0055509 A1* | 2/2020 | Stahr | B60T 8/363 |

FOREIGN PATENT DOCUMENTS

| | | |
|---|---|---|
| JP | 4-286103 A | 10/1992 |
| JP | 6-77046 A | 3/1994 |
| JP | 8-306527 A | 11/1996 |
| JP | 2000-50606 A | 2/2000 |
| JP | 2002-198219 A | 7/2002 |
| JP | 2002-272080 A | 9/2002 |
| JP | 2003-148647 A | 5/2003 |
| JP | 2005-150305 A | 6/2005 |
| JP | 2011-240731 A | 12/2011 |

* cited by examiner

FIG.13A  FIG.13B
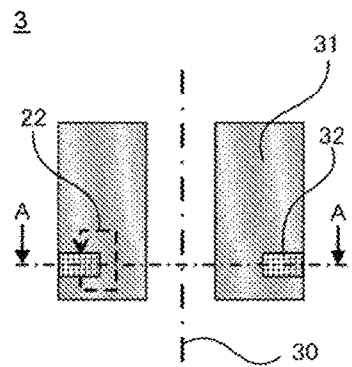
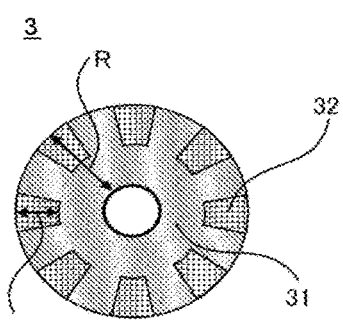
FIG.14
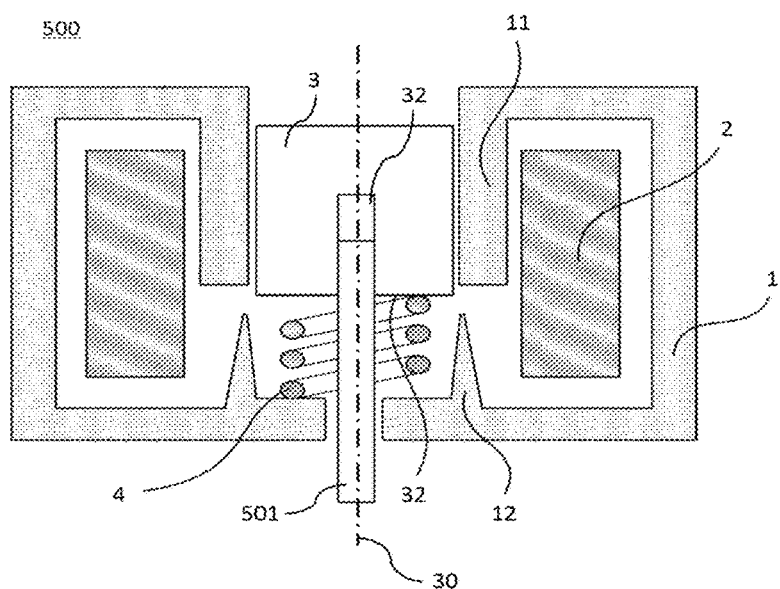
FIG.15A  FIG.15B
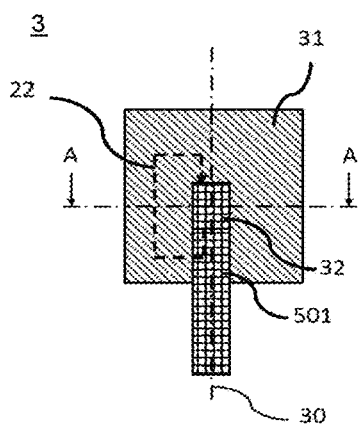
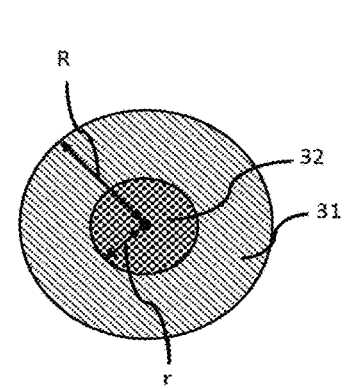

ELECTROMAGNETIC ACTUATOR AND HYDRAULIC PRESSURE ADJUSTMENT MECHANISM

CROSS-REFERENCE TO RELATED APPLICATIONS

The present application is a continuation application of International Application No. PCT/JP2018/012801, filed Mar. 28, 2018, which claims priority to Japanese Patent Application No. 2017-144115, filed Jul. 26, 2017. The contents of these applications are incorporated herein by reference in their entirety.

TECHNICAL FIELD

The present invention relates to an electromagnetic actuator configured to linearly move a movable element made of a magnetic material with an electromagnetic force, and a hydraulic pressure adjustment mechanism using the same.

BACKGROUND ART

Hitherto, there has been known an electromagnetic actuator in which a movable element including a permanent magnet is moved by an electromagnetic force generated by a coil. In the electromagnetic actuator of this type, a magnetic flux generated in the movable element by the permanent magnet flows in the same direction as a magnetic flux generated by the coil. As a result, in addition to the magnetic flux generated by the coil, the magnetic flux generated by the permanent magnet contributes to the movable element, thereby increasing a thrust force (for example, Patent Literature 1).

CITATION LIST

Patent Literature

[PTL 1] JP 2000-50606 (FIG. 1 and FIG. 3)

SUMMARY OF INVENTION

Technical Problem

An electromagnetic actuator described in Patent Literature 1 including a magnet disposed on the movable element has a problem in that a magnetic attraction force exerted in a direction opposite to a direction of the thrust force acts between a permanent magnet and a core case, with the result that the amount of increase in thrust force is reduced in a part of a stroke. Specifically, the following problem is given. The attraction force generated by the permanent magnet acts in a moving direction of the movable element at start of the stroke. However, when the permanent magnet is positioned in a gap defined between a center axis portion of the core case and an attraction portion by the stroke of the movable element, an equivalent attraction force contributes between the movable element and the attraction portion of the core case and between the movable element and the center axis portion of the core case. As a result, improvement in thrust force of the movable element by the attraction force of the permanent magnet cannot be achieved. This is because the permanent magnet serves as a magnetic resistance to hinder the improvement in thrust force of the movable element.

The present invention has been made to solve the problem described above, and has an object to obtain an electromagnetic actuator capable of improving a thrust force of a movable element by preventing a problem in that the amount of increase in thrust force of a movable element is reduced, which occurs in a part of a stroke.

Solution to Problem

According to the present invention, there is provided an electromagnetic actuator, including: a stator, which has a first surface at one end in an axial direction and a second surface at another end in the axial direction, and is made of a soft magnetic material having a tubular space formed in the axial direction; and a movable element, which is disposed in the tubular space, and is configured to move along the axial direction, wherein the stator includes: a coil, which is provided in the stator, and is configured to excite the stator; a core portion, which is arranged between the coil and the movable element, and extends from the first surface side towards the second surface side; and a protrusion portion, which is arranged between the coil and the movable element, and protrudes from the second surface side towards the first surface side, wherein the movable element includes a movable element core made of a soft magnetic material and a permanent magnet, and wherein at least one of a radially inner side and a radially outer side of the permanent magnet is covered by a movable element core.

Advantageous Effects of Invention

In the electromagnetic actuator according to the invention of the present application, a magnetic circuit formed by the permanent magnet is formed mainly in the movable element, and an action of the magnetic attraction force, which is generated in a direction opposite to a direction of the thrust force, on the movable element is significantly reduced. Therefore, an effect of improving the thrust force of the movable element is attained.

BRIEF DESCRIPTION OF DRAWINGS

FIG. 13A is a sectional view for illustrating a part of the electromagnetic actuator, and is an illustration of the movable element extracted from FIG. 12.

FIG. 13B is a sectional view taken along the line A-A of FIG. 13A.

FIG. 14 is a sectional view for schematically illustrating an electromagnetic actuator according to a fifth embodiment of the present invention.

FIG. 15A is a sectional view for illustrating a part of the electromagnetic actuator, and is an illustration of the movable element extracted from FIG. 14.

FIG. 15B is a sectional view taken along the line A-A of FIG. 15A.

DESCRIPTION OF EMBODIMENTS

Now, electromagnetic actuators according to embodiments of the present invention are described with reference to the drawings. In the description of the plurality of embodiments, components which are substantially the same as those of a first embodiment are denoted by the same reference symbols, and description thereof is omitted.

First Embodiment

Figure 1:
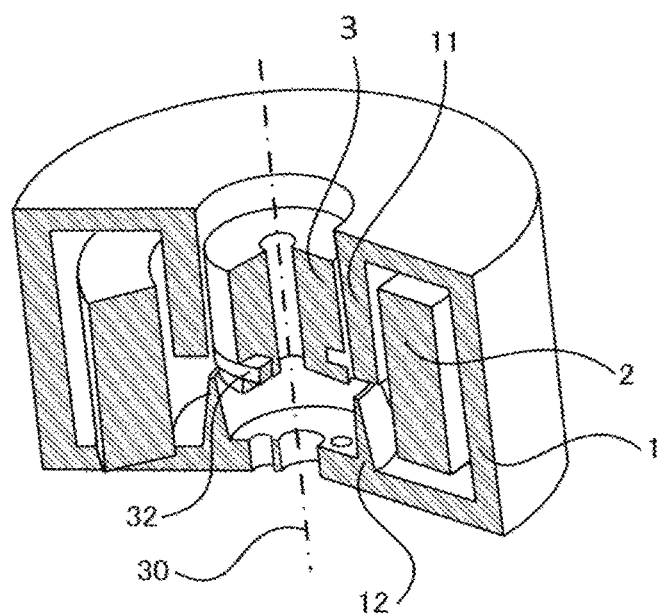
FIG. 1 is a perspective view for schematically illustrating an electromagnetic actuator according to a first embodiment of the present invention.
Figure 2:
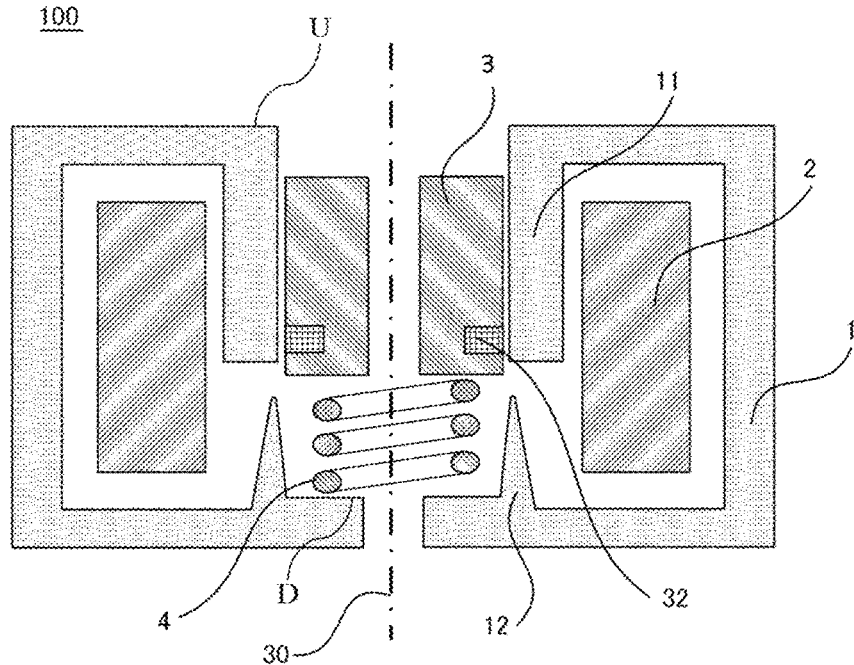
FIG. 2 is a sectional view for schematically illustrating the electromagnetic actuator according to the first embodiment of the present invention.
Figure 3:
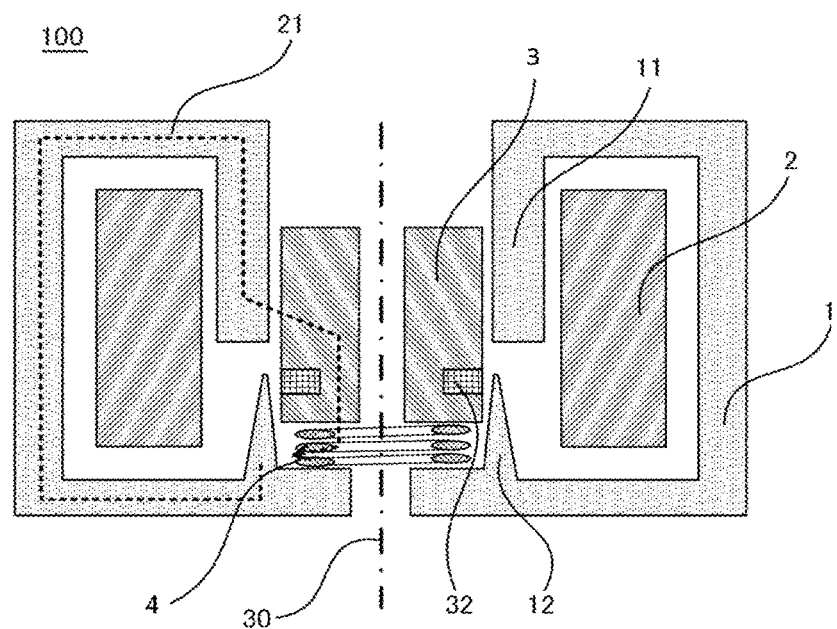
FIG. 3 is a sectional view for schematically illustrating the electromagnetic actuator according to the first embodiment of the present invention.
Figures 4A, 4B:
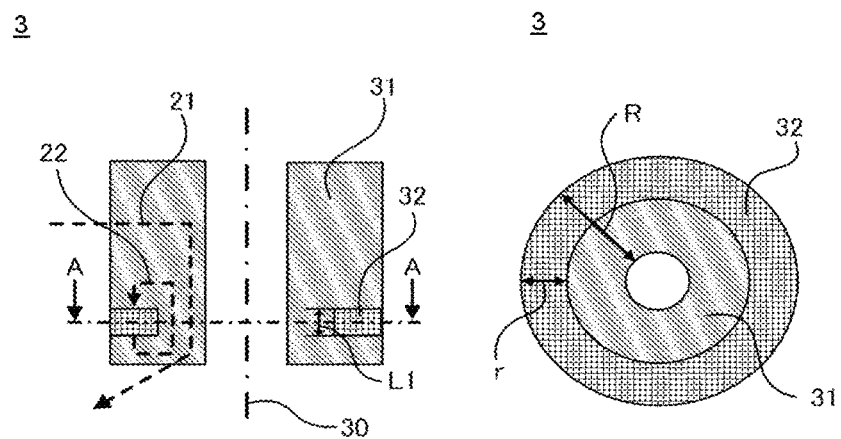
FIG. 4A is a view for illustrating the movable element extracted from FIG. 3.
FIG. 4B is a sectional view taken along the line A-A of FIG. 4A.

FIG. 1 is a perspective view for schematically illustrating an electromagnetic actuator 100 according to a first embodiment of the present invention. In FIG. 1, for convenience of description, a stator 1, a coil 2, a movable element 3, and a permanent magnet 32 are partially illustrated in sectional view. FIG. 2 is a sectional view for schematically illustrating the electromagnetic actuator 100 when not being energized. FIG. 3 is a sectional view for schematically illustrating the electromagnetic actuator 100 when being energized. FIG. 4 are sectional views for schematically illustrating the movable element 3 of the electromagnetic actuator 100. FIG. 4A is a view for illustrating the movable element 3 extracted from FIG. 3. Moreover, FIG. 4B is a sectional view taken along the line A-A of FIG. 4A.

The electromagnetic actuator 100 includes the stator 1 having a cylindrical space on an inner side thereof, the coil 2 disposed in the stator 1, and the movable element 3 configured to move in an axial direction in the cylindrical space defined on the inner side of the stator 1. The movable element 3 includes a movable element core 31 and the permanent magnet 32.

In the following, for convenience of description, a surface of the stator 1 having a core portion 11 formed thereon (U in FIG. 2) is referred to as "upper surface" (first surface), and a surface of the stator 1 having a protrusion portion 12 formed thereon in an inner space (D in FIG. 2) is referred to as "lower surface" (second surface). The axial direction corresponds to a direction extending from the upper surface towards the lower surface.

The stator 1 has a cylindrical shape. As described above, the stator 1 has a cylindrical space on an inner side thereof. The cylindrical space is defined by the core portion 11 and the protrusion portion 12 surrounding a periphery thereof. The core portion 11 extends from the upper surface side towards the lower surface side of the stator 1. The protrusion portion 12 extends from the lower surface side towards the upper surface side and is opposed to a lower end of the core portion 11. A gap having a constant distance is defined between the lower end of the core portion 11 and a distal end of the protrusion portion 12. The stator 1 is made of a magnetic material. A typical magnetic material is iron.

The movable element 3 has a cylindrical shape, and has a cylindrical hollow portion on an inner side thereof. The movable element 3 is disposed in a cylindrical space defined on the inner side of the stator 1 so that axial directions of the movable element 3 and the stator 1 match each other. A lower end surface of the movable element 3, that is, a surface of the movable element 3 which is opposed to the lower surface of the stator 1 is coupled to the stator 1 by a spring 4 which is disposed on an inner peripheral side of the protrusion portion 12 formed on the lower surface of the stator 1. The cylindrical space of the stator 1 and the cylindrical hollow portion of the movable element 3 have a common center axis.

The movable element 3 is held by an elastic force of the spring 4 in the cylindrical space on the inner side of the stator 1. The movable element 3 is made of a magnetic material. A typical magnetic material is iron. The magnetic material forming the movable element 3 may be the same material as the magnetic material of the stator 1 or may be a different magnetic material.

In the electromagnetic actuator 100 according to the first embodiment, the spring 4 being a kind of an elastic member is used to couple the movable element 3 to the lower surface of the stator 1. However, the movable element 3 may be held in the cylindrical space of the stator 1 by holding means using hydraulic pressure or air pressure so as to be freely movable.

The coil 2 is provided in the stator 1. A magnetic flux 21 generated through energization of the coil 2 is routed around in a path of the core portion 11 of the stator 1, the movable element core 31, and the protrusion portion 12 in the state order to form a magnetic circuit.

As illustrated in FIG. 4B, the permanent magnet 32 is annularly formed in the movable element 3. Upper and lower end surfaces in the axial direction and an inner peripheral surface of the permanent magnet 32 are covered by the movable element core 31. Meanwhile, an outer peripheral surface of the permanent magnet 32 forms a part of an outer side surface of the cylindrical movable element 3, and is exposed to an outside and opposed to a surface of the stator 1 which defines the cylindrical space on the inner side of the stator 1. The upper and lower end surfaces of the permanent magnet 32 are in a positional relationship of being parallel to the upper and lower end surfaces of the movable element core 31. As illustrated in FIG. 4B, the permanent magnet 32 is annularly arranged, and the outer peripheral surface of the permanent magnet 32 forms a part of the side surface of the movable element 3. There may be adopted a configuration in which the entirety of the upper and lower end surfaces of the permanent magnet 32 in the axial direction is not covered by the movable element core 31.

The permanent magnet 32 is magnetized in a direction extending from the upper surface towards the lower surface. With this, as indicated by the broken line in FIG. 4A, a magnetic flux 22 generated by the permanent magnet 32 flows from the lower end surface of the permanent magnet 32 towards the upper end surface of the permanent magnet 32 through an inside of the movable element core 31. Thus, the magnetic flux 22 generated by the permanent magnet 32 flows in a direction opposite to the direction of the magnetic flux 21 which is generated in the movable element core 31 through energization of the coil 2 on the inner peripheral side of the permanent magnet 32. This point is significantly different from the related-art electromagnetic actuator in which directions of the magnetic flux generated by the permanent magnet and the magnetic flux generated by the coil match each other. The magnetization direction of the permanent magnet 32 described above is given in the case in which the magnetic flux 21 generated through energization of the coil 2 flows in the order of the core portion 11, the movable element core 31, and the protrusion portion 12. When an energizing direction of the coil 2 is opposite, the magnetization direction of the permanent magnet 32 is also opposite.

As described above, the upper and lower end surfaces of the permanent magnet 32 are covered by the movable element core 31. Moreover, it is desired that an axial length L1 of the permanent magnet 32 correspond to such a distance that the magnetic material forming the movable element core 31 located on the inner peripheral side of the permanent magnet 32 is prevented from being magnetically saturated by the magnetic flux 22 generated by the permanent magnet 32 when the coil 2 is not energized. This is because, when the movable element core 31 is magnetically saturated by the magnetic flux 22, the amount of the magnetic flux 22 which flows from the movable element 3 towards the core portion 11 of the stator 1 increases, and a magnetic attraction force exerted in a direction opposite to the direction of the thrust force acts on the movable element 3, with the result that the thrust force is reduced. When the movable element core 31 is not magnetically saturated by the magnetic flux 22, the magnetic flux 22 flows mainly through the magnetic circuit formed in the movable element 3, and the amount of the magnetic flux 22 which flows towards the core portion 11 is reduced, thereby being capable of suppressing the reduction in thrust force.

When the coil 2 is not energized, as illustrated in FIG. 2, the movable element 3 is located so that, in the cylindrical space on the inner side of the stator 1, the lower end surface of the permanent magnet 32 is located above the lower end of the core portion 11 of the stator 1. Meanwhile, when the coil 2 is energized, as illustrated in FIG. 3, the lower end surface of the permanent magnet 32 moves to a position below the lower end of the core portion 11 of the stator 1, that is, towards the lower surface side of the stator 1. During the movement of the movable element 3, the magnetic flux 21 flows in the order of the core portion 11 of the stator 1, the movable element core 31, and the protrusion portion 12 of the stator 1. Moreover, in a space of the movable element core 31 which is sandwiched between the same planes as the upper and lower end surfaces of the permanent magnet 32, the directions of the magnetic flux 21 and the magnetic flux 22 are opposite to each other, and hence the magnetic flux 21 is cancelled out by the magnetic flux 22. As a result, the magnetic saturation in the movable element core 31 by the magnetic flux 21 is alleviated. Thus, the magnetic resistance of the magnetic flux 21 generated through the energization of the coil 2 becomes smaller, and hence the magnetic flux amount of the magnetic flux 21 is increased, and the thrust force of the movable element 3 is improved.

In the configuration of the electromagnetic actuator 100 according to the first embodiment, the annular permanent magnet 32 is divided into segments in a circumferential direction. After magnetization in a desired direction, the segments of the annular permanent magnet 32 are fitted and inserted from a radially outer side into an annular groove formed in the outer peripheral surface of the movable element core 31. Through use of an adhesive applied between the movable element core 31 and the permanent magnet 32, the permanent magnet 32 is integrally fixed to the movable element core 31.

Now, description is made of an operation of the electromagnetic actuator 100. When the coil 2 is not energized, the movable element 3 is held by the elastic force of the spring 4 in the cylindrical space defined on the inner side of the stator 1 so that the lower end surface of the permanent magnet 32 is located above the lower end of the core portion 11 of the stator 1. The position illustrated in FIG. 2 corresponds to the state in which the movable element 3 is held by the elastic force of the spring 4.

Next, description is made of a behavior of the movable element 3 when the coil 2 is energized. The magnetic flux 21 generated through energization of the coil 2 forms a magnetic circuit of a flow from the core portion 11 of the stator 1 to the protrusion portion 12 through the movable element core 31 of the movable element 3.

When the coil 2 is energized, the magnetic flux 21 flowing through the stator 1 flows also into the movable element core 31, and the movable element 3 forms the magnetic circuit together with the stator 1. The magnetic flux 21 generates a magnetic attraction force between the stator 1 and the movable element core 31. Then, owning to a component acting in the axial direction in the magnetic attraction force which acts between the protrusion portion 12 of the stator 1 and the movable element core 31, a thrust force towards the lower surface of the stator 1 along the axial direction is generated in the movable element 3. When the thrust force of the movable element 3 in the axial direction is larger than a net force of a spring force, which is a reaction force of the thrust force, and a friction force, the movable element 3 moves towards the lower surface of the stator 1 along the axial direction.

When the energization of the coil 2 is stopped, the magnetic flux 21 having been generated through the energization of the coil 2 is not generated. As a result, the magnetic attraction force generated by the magnetic flux 21 also does not act on the movable element 3. Therefore, the movable element 3 returns again by the elastic force of the spring 4 to the position given when the coil 2 is not energized. As described above, through the switching between the energization state and the non-energization state of the coil 2, the movable element 3 performs a reciprocating motion in the axial direction.

In the related-art electromagnetic actuator, as described above, directions of the magnetic flux generated by the coil in the movable element and the magnetic flux generated from the permanent magnet are matched with each other. However, the following problem arises in this case.

Figure 5:
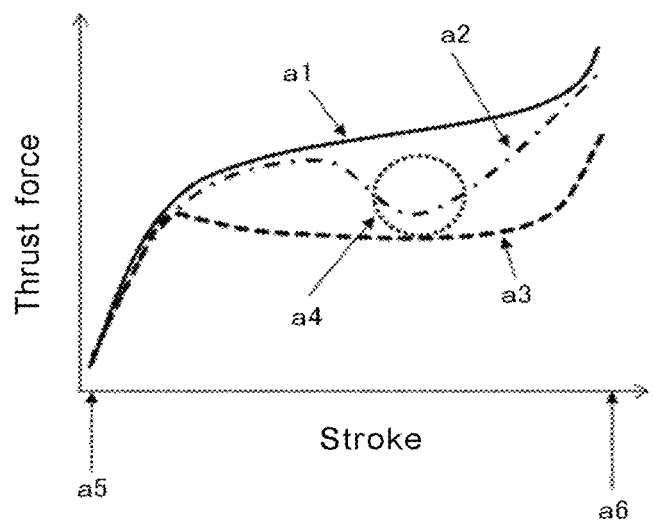
FIG. 5 is a graph for showing an effect of the electromagnetic actuator according to the first embodiment of the present invention.

FIG. 5 is a graph for showing an effect of the electromagnetic actuator according to the present invention. The solid line a1 indicates a thrust force with respect to a stroke of the electromagnetic actuator according to the present invention. The line a2 indicates a thrust force with respect to a stroke of a related-art electromagnetic actuator which includes a movable element portion including a permanent magnet. The line a3 indicates a thrust force with respect to a stroke of a related-art electromagnetic actuator which includes a movable element portion not including a permanent magnet. The line a4 indicates the following defect. Specifically, as a magnetic flux generated from a permanent magnet flows in a magnetic circuit formed between a core portion of a stator and a movable element, in a part of a stroke, specifically, when an upper end surface of the permanent magnet in the movable element is located below a lower end surface of the core portion of the stator, a magnetic attraction force exerted in a direction opposite to a direction of a thrust force acts between the permanent magnet and the core portion, with the result that the magnetic attraction force serves as a reaction force with respect to the thrust force of the movable element to reduce the thrust force of the movable element. The position a5 indicates a stopping position of a movable element when a coil is not energized, and the position a6 indicates a stopping position of the movable element when the coil is energized.

Meanwhile, in the electromagnetic actuator 100 according to the first embodiment of the present invention, when the magnetic flux 21 is generated through the energization of the coil 2, the magnetic saturation occurs in the movable element core 31. A part of the movable element core 31 in which the magnetic saturation occurs most is a magnetic material portion which is present in the space of the movable element core 31 which is sandwiched between the same planes as the upper and lower end surfaces of the permanent magnet 32 in the axial direction. This is because the above-mentioned portion is a portion having a smallest sectional area of a cross section perpendicular to the axial direction in the movable element core 31.

In the electromagnetic actuator 100 according to the first embodiment of the present invention, at least one of the radially inner side and the radially outer side of the permanent magnet 32 is covered by the movable element core 31. Moreover, in the electromagnetic actuator 100, as described above, the magnetic flux 21 flows in the axial direction in the space sandwiched between the same planes as the upper and lower end surfaces of the permanent magnet 32 of the movable element core 31, and a direction of the magnetic flux 21 is the same as the magnetization direction of the permanent magnet 32. As a result of adopting such configuration, in the space sandwiched between the same planes as the upper and lower surfaces of the permanent magnet 32 of the movable element core 31, directions of the magnetic flux 21 and the magnetic flux 22 are opposite to each other, and hence the magnetic flux 21 is cancelled out by the magnetic flux 22. As a result, the magnetic saturation in the movable element core 31 by the magnetic flux 21 is alleviated. Further, the magnetic flux 22 generated from the permanent magnet 32 flows mainly through the magnetic circuit formed in the movable element 3, and hence the magnetic attraction force generated by the magnetic flux 22 which acts between the movable element 3 and the core portion 11 of the stator 1 and between the movable element 3 and the protrusion portion 12 is significantly reduced. Therefore, the defect which has arisen in the related-art electromagnetic actuator, that is, the defect that the thrust force of the movable element 3 is reduced in a part of a stroke is avoided. As a result, the thrust force of the movable element 3 is improved.

According to the electromagnetic actuator 100 of the first embodiment, when the coil 2 is not energized, only the magnetic flux 22 generated by the permanent magnet 32 flows in the movable element core 31, but the magnetic flux 22 flows mainly through the magnetic circuit formed in the movable element core 31 and substantially does not flow to the outside of the movable element core 31. Thus, the magnetic attraction force which acts between the movable element 3 and the protrusion portion 12 of the stator 1 and the magnetic attraction force which acts between the movable element 3 and the core portion 11 can be suppressed. Further, when the coil 2 is energized, the magnetic flux 22 generated by the permanent magnet 32 suppresses local saturation of the magnetic flux 21 generated by the coil 2, and hence the magnetic flux amount of the magnetic flux 21 can be increased. Moreover, the magnetic flux 22 of the permanent magnet 32 flows mainly in the movable element core 31, and hence the magnetic attraction force which acts in a direction opposite to the direction of the thrust force between the permanent magnet 32 and the core portion 11 can be suppressed. Therefore, the defect that the thrust force is reduced in a part of a stroke in the movable element 3 is avoided, thereby attaining an effect of improving the thrust force of the movable element in the overall operation of the electromagnetic actuator 100. As a result, when the coil 2 is not energized, the movable element 3 can be held through use of a stronger spring, thereby improving oscillation resistance of the electromagnetic actuator 100.

Second Embodiment

Figure 6:
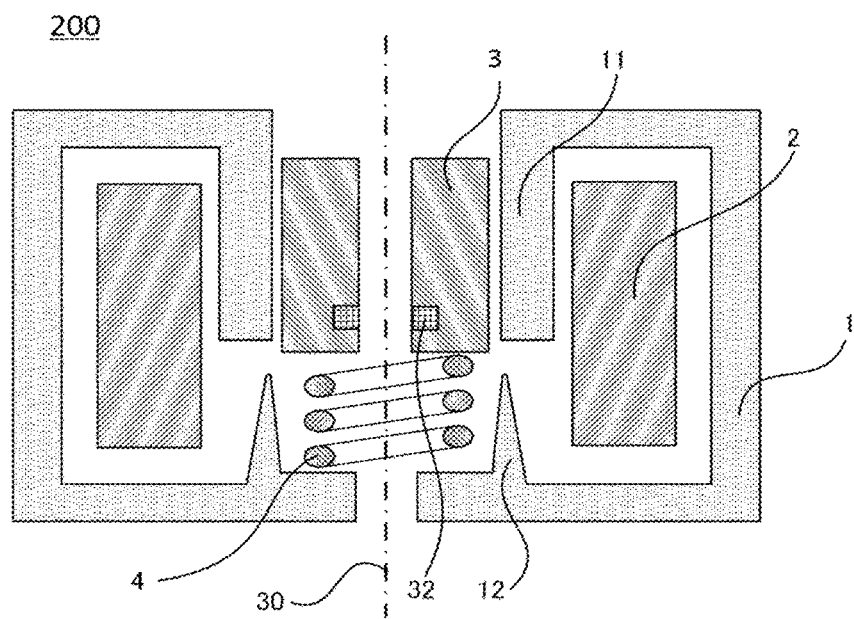
FIG. 6 is a sectional view for schematically illustrating an electromagnetic actuator according to a second embodiment of the present invention.
Figures 7A, 7B:
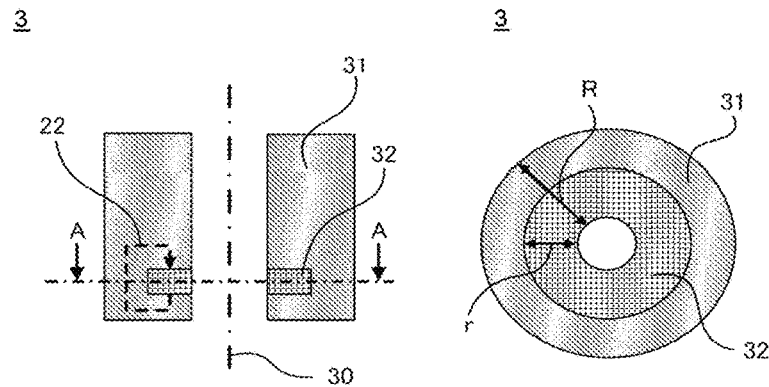
FIG. 7A is a sectional view for illustrating a part of the electromagnetic actuator, and is an illustration of the movable element extracted from FIG. 6.
FIG. 7B is a sectional view taken along the line A-A of FIG. 7A.
Figure 8:
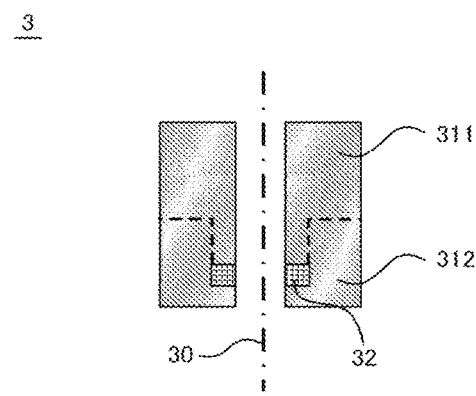
FIG. 8 is a sectional view for illustrating a part of the electromagnetic actuator according to the second embodiment of the present invention.

Description is made of an electromagnetic actuator 200 according to a second embodiment of the present invention with reference to FIG. 6, FIG. 7, and FIG. 8. FIG. 6 is a sectional view for schematically illustrating the electromagnetic actuator 200 according to the second embodiment of the present invention. FIG. 7A is a sectional view for illustrating a part of the electromagnetic actuator 200, and is an illustration of the movable element 3 extracted from FIG. 6. Moreover, FIG. 7B is a sectional view taken along the line A-A of FIG. 7A. FIG. 8 is a sectional view for illustrating a part of the electromagnetic actuator 200 according to the second embodiment of the present invention.

In FIG. 6 and FIG. 7, components which are denoted by the same reference symbols as those of FIG. 2 and FIG. 4 are the same or corresponding components. Thus, description thereof is omitted, and only portions which are different in configuration and operation from the electromagnetic actuator 100 according to the first embodiment are described.

With reference to FIG. 6 and FIG. 7, a position of the permanent magnet 32 provided to the movable element 3 is described. In the electromagnetic actuator 200 according to the second embodiment, as illustrated in FIG. 7B, the permanent magnet 32 is annularly formed, and an inner peripheral surface of the permanent magnet 32 forms a part of an inner side surface of the cylindrical movable element 3, and is exposed to the cylindrical hollow portion of the movable element 3. Meanwhile, the upper and lower end surfaces in the axial direction and the outer peripheral surface of the permanent magnet 32 are covered by the movable element core 31 made of a magnetic material. The upper and lower end surfaces of the permanent magnet 32 are in a positional relationship of being parallel to the upper and lower end surfaces of the movable element core 31. As illustrated in FIG. 7B which is a sectional view of the movable element 3 taken along the line A-A of FIG. 7A, the permanent magnet 32 is annularly arranged, and the inner peripheral surface of the permanent magnet 32 forms a part of the inner peripheral surface of the hollow portion on an inner side of the movable element 3. There may be adopted a configuration in which the entirety of the upper and lower end surfaces of the permanent magnet 32 in the axial direction in not covered by the movable element core 31.

In the configuration of the electromagnetic actuator 200 according to the second embodiment, for example, the permanent magnet 32 is arranged so as to be sandwiched by the movable element core 31 divided into two segments in the axial direction, and at least one of the radially inner side and the radially outer side of the permanent magnet 32 is covered by the movable element core 31. An example of a division part of the movable element core 31 is indicated by the broken lines in FIG. 8. The permanent magnet 32 is sandwiched between a segment component 311, which is an upper part of the movable element core 31 in the axial direction illustrated in FIG. 8, and a segment component 312, which is a lower part of the movable element core 31 in the axial direction illustrated in FIG. 8. The movable element core 31 having the divided configuration in the above-mentioned mode is integrally fixed to the permanent magnet 32 through a step of joining the segment component 311 and the segment component 312 by press-fitting or use of an adhesive.

According to the electromagnetic actuator 200 of the second embodiment, in addition to the effect similar to that of the first embodiment, the following effect is attained. As the permanent magnet 32 is disposed on the inner peripheral side of the movable element 3, the permanent magnet 32 and the core portion 11 are further separated apart from each other as compared to the configuration of the electromagnetic actuator 100 according to the first embodiment. Thus, the amount of the magnetic flux 22 flowing into the core portion 11 is further reduced as compared to the electromagnetic actuator 100 according to the first embodiment, and hence the reduction in thrust force of the movable element 3 due to an action of the magnetic attraction force generated by the magnetic flux 22 between the movable element 3 and the core portion 11 can be further suppressed as compared to the electromagnetic actuator 100 according to the first embodiment.

Third Embodiment

Figure 9:
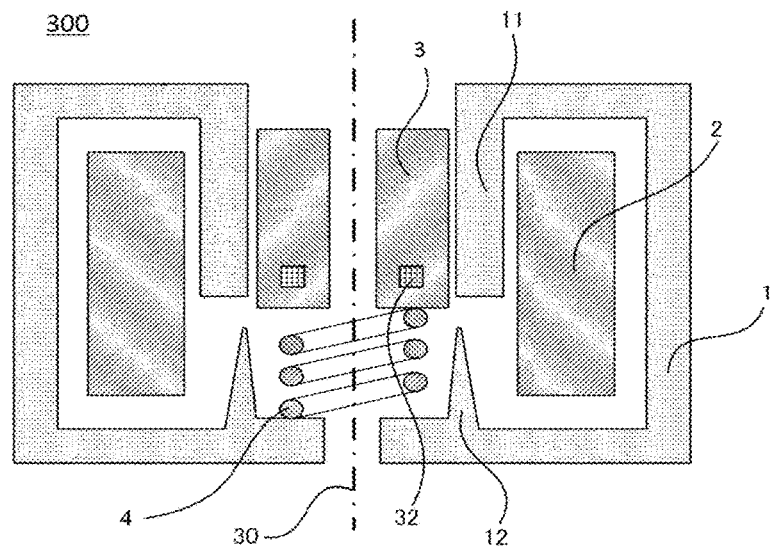
FIG. 9 is a sectional view for schematically illustrating an electromagnetic actuator according to a third embodiment of the present invention.
Figures 10A, 10B:
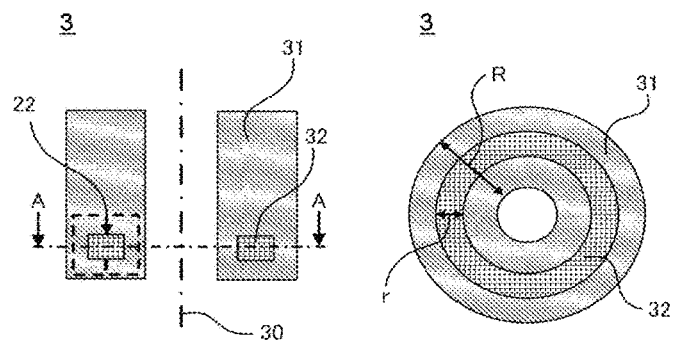
FIG. 10A is a sectional view for illustrating a part of the electromagnetic actuator, and is an illustration of the movable element extracted from FIG. 9.
FIG. 10B is a sectional view taken along the line A-A of FIG. 10A.
Figure 11:
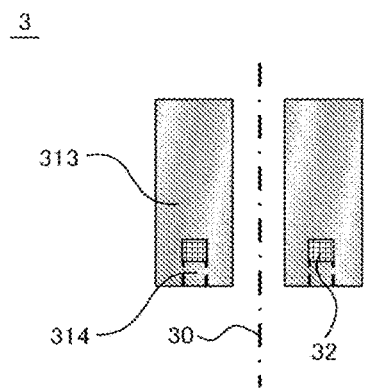
FIG. 11 is a sectional view for illustrating a part of the electromagnetic actuator according to the third embodiment of the present invention.

Description is made of an electromagnetic actuator 300 according to a third embodiment of the present invention with reference to FIG. 9, FIG. 10, and FIG. 11. FIG. 9 is a sectional view for schematically illustrating the electromagnetic actuator 300 according to the third embodiment of the present invention. FIG. 10A is a sectional view for illustrating a part of the electromagnetic actuator 300, and is an illustration of the movable element 3 extracted from FIG. 9. Moreover, FIG. 10B is a sectional view taken along the line A-A of FIG. 10A. FIG. 11 is a sectional view for illustrating the movable element 3 of the electromagnetic actuator 300 according to the third embodiment of the present invention.

In FIG. 9 and FIG. 10, components which are denoted by the same reference symbols as those of FIG. 2 and FIG. 4 are the same or corresponding components. Thus, description thereof is omitted, and only portions which are different in configuration and operation from the first embodiment are described.

With reference to FIG. 9 and FIG. 10, a position of the permanent magnet 32 provided to the movable element 3 is described. In the electromagnetic actuator 300 according to the third embodiment, as illustrated in FIG. 10B, the permanent magnet 32 is annularly arranged in the movable element 3, and the upper and lower end surfaces in the axial direction and the inner and outer peripheral surfaces of the permanent magnet 32 are covered by the movable element core 31 made of a magnetic material. The upper and lower end surfaces of the permanent magnet 32 are in a positional relationship of being parallel to the upper and lower end surfaces of the movable element 3.

The broken lines in FIG. 11 indicate division parts of the movable element 3. The permanent magnet 32 is annularly formed, and the movable element core 31 is divided into two components including a component 313 having a recess portion and a component 314 having an annular shape. After the permanent magnet 32 having an annular shape is inserted into the movable element core 313 having the recess portion, another component 314 of the movable element core 31 having an annular shape is inserted into the recess portion, and the component 313 of the movable element core 31 having the recess portion, the component 314 having an annular shape, and the permanent magnet 32 are fixed through use of, for example, an adhesive. As a result, the movable element core 31 and the permanent magnet 32 are integrated.

According to the electromagnetic actuator 300 of the third embodiment, in addition to the effect similar to that of the electromagnetic actuator 100 according to the first embodiment, the following effect is attained. The upper and lower end surfaces and the inner and outer peripheral surfaces of the permanent magnet 32, that is, all of the surfaces are covered by the movable element core 31, and hence the amount of the magnetic flux 22 flowing into the core portion 11 is further reduced as compared to the electromagnetic actuator 100 according to the first embodiment. Therefore, the reduction in thrust force of the movable element 3 due to an action of the magnetic attraction force generated by the magnetic flux 22 between the movable element 3 and the core portion 11 can be further suppressed. Moreover, as the entirety of the permanent magnet 32 is covered by the movable element core 31, even when cracking or chipping occurs in the permanent magnet 32, separation and dispersion of the permanent magnet 32 from the movable element 3 can be suppressed.

Fourth Embodiment

Figure 12:
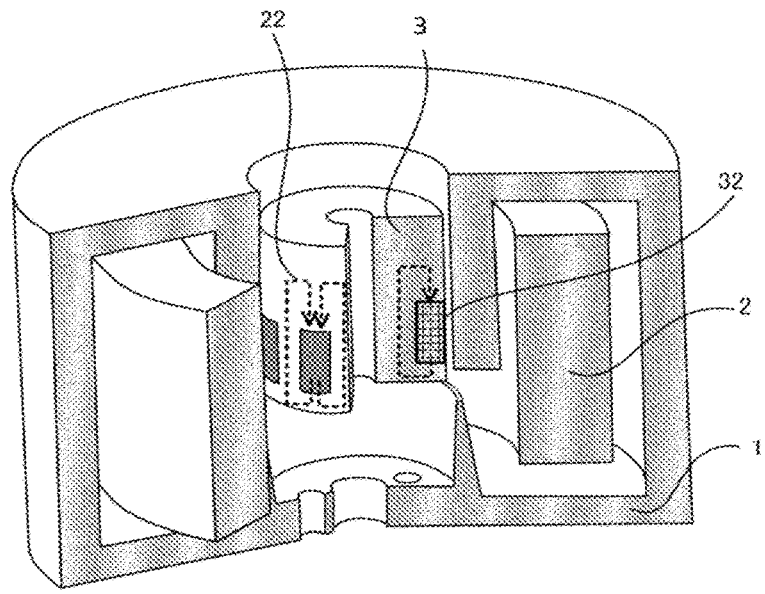
FIG. 12 is a perspective view for schematically illustrating an electromagnetic actuator according to a fourth embodiment of the present invention.

Description is made of an electromagnetic actuator 400 according to a fourth embodiment of the present invention with reference to FIG. 12 and FIG. 13. FIG. 12 is a perspective view for schematically illustrating the electromagnetic actuator 400 according to the fourth embodiment of the present invention. FIG. 13A is a sectional view for illustrating a part of the electromagnetic actuator 400, and is an illustration of the movable element 3 extracted from FIG. 12. Moreover, FIG. 13B is a sectional view taken along the line A-A of FIG. 13A. In FIG. 12 and FIG. 13, components which are denoted by the same reference symbols as those of FIG. 1 and FIG. 4 are the same or corresponding components. Thus, description thereof is omitted, and only portions which are different in configuration and operation from the first embodiment are described.

With reference to FIG. 13, positions of the permanent magnet 32 provided to the movable element 3 are described. In the electromagnetic actuator 400 according to the fourth embodiment, as illustrated in FIG. 13B, the permanent magnet 32 is divided into a plurality of segments and annularly arranged in the movable element 3. That is, the plurality of segments of the permanent magnet 32 are disposed so as to be inserted into a plurality of grooves which are formed in the movable element core 31 so as to extend in the radial direction from the outer peripheral surface. That is, the permanent magnet 32 formed of the plurality of segments is covered at parts other than the outer peripheral surface by the movable element core 31 made of a magnetic material. Meanwhile, the outer peripheral surface of the permanent magnet 32 forms a part of the outer side surface of the cylindrical movable element 3, is exposed to the outside, and is opposed to the surface defining the inner space of the stator 1. There may be employed a configuration in which the upper and lower end surfaces of the permanent magnet 32 are in a positional relationship of being parallel to the upper and lower end surfaces of the movable element core 31, and in which the entire surface is not covered by the movable element core 31.

The plurality of segments of the permanent magnet 32 are inserted into the movable element core 31 and thereafter fixed to the movable element core 31 by, for example, an adhesive and a magnetic force of the permanent magnet 32. As a result, the movable element core 31 and the permanent magnet 32 are integrated.

According to the electromagnetic actuator 400 of the fourth embodiment, in addition to the effect similar to that of the first embodiment, the following effect is attained. In the cross section taken along the line A-A, a ratio of a sectional area of the cross section perpendicular to the axial direction occupied by the permanent magnet 32 is reduced as compared to the electromagnetic actuator 100 according to the first embodiment, and a larger sectional area of the movable element core 31 can be secured. Thus, the magnetic saturation in the movable element core 31 is further alleviated. Therefore, the amount of the magnetic flux 21 is further increased, thereby improving the thrust force.

With regard to the electromagnetic actuator 400 according to the fourth embodiment of the present invention, description is made with an example of a case in which the permanent magnet 32 is provided on the outer peripheral surface of the movable element core 31. However, as in the electromagnetic actuator 300 according to the second embodiment and the third embodiment, the permanent magnet 32 may be provided on the inner peripheral surface side of the movable element core 31 or inside the movable element core 31.

With respect to a radial length R of the movable element 3 illustrated in FIG. 4B, FIG. 7B, FIG. 10B, and FIG. 13B, a radial length "r" of the permanent magnet 32 is set so as to fall within a range of 0<r<(R/2). This is because of the following reason. When the radial length "r" of the permanent magnet 32 has a ratio equal to or larger than the radial length R/2 of the movable element 3, the sectional area of the movable element core 31 which allows the magnetic flux 21 generated through the energization of the coil 2 to pass therethrough becomes smaller, which may cause a defect such as occurrence of the magnetic saturation.

Fifth Embodiment

Description is made of an electromagnetic actuator 500 according to a fifth embodiment of the present invention with reference to FIG. 14 and FIG. 15. FIG. 14 is a sectional view for schematically illustrating the electromagnetic actuator 500 when not being energized. FIG. 15A is a sectional view for illustrating apart of the electromagnetic actuator 500. FIG. 15B is a sectional view taken along the line A-A of FIG. 15A. Components which are denoted by the same reference symbols as those of FIG. 1 and FIG. 4 are the same or corresponding components. Thus, description thereof is omitted, and only portions which are different in configuration and operation from the first embodiment are described.

The permanent magnet 32 has a configuration in which an upper surface and an outer peripheral surface thereof are covered by the movable element core 31 and in which a lower surface thereof is covered by a drive shaft 501 which moves integrally with the movable element 3.

After the permanent magnet 32 is inserted into the movable element core 31, the drive shaft 501 is inserted into the movable element core 31. Thus, the movable element core 31, the permanent magnet 32, and the drive shaft 501 are integrated. It is only required that the drive shaft 501 be inserted into the movable element core 31 so as to move integrally with the movable element 3, and it is not required that the drive shaft 501 be brought into direct contact with the lower surface of the permanent magnet 32.

According to the electromagnetic actuator 500 of the fifth embodiment, in addition to the effect similar to that of the electromagnetic actuator 100 according to the first embodiment, the following effect is attained. As the upper surface and the outer peripheral surface of the permanent magnet 32 are covered by the movable element core 31, and the lower surface is covered by the drive shaft 501, even when cracking or chipping occurs in the permanent magnet 32, separation and dispersion of the permanent magnet 32 from the movable element 3 can be suppressed. Moreover, the permanent magnet 32 may be formed into, for example, a columnar shape, and is not required to be processed into a special shape, thereby being capable of reducing processing cost.

Sixth Embodiment

Figure 16:
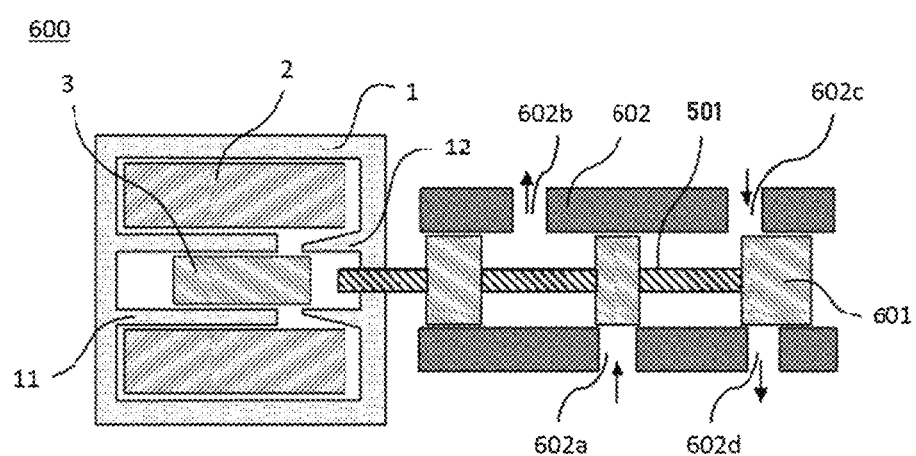
FIG. 16 is a schematic view for illustrating a hydraulic pressure adjustment mechanism according to a sixth embodiment of the present invention.

As one example of application of the electromagnetic actuators according to the first to fifth embodiments, in FIG. 16, there is given a schematic view of a hydraulic pressure adjustment mechanism 600 using the electromagnetic actuator. The hydraulic pressure adjustment mechanism 600 has a configuration in which the drive shaft 501 and a spool valve 601 are integrally moved by a thrust force acting on the movable element 3. Ports 602a, 602b, 602c, and 602d formed in a sleeve 602 are opened or closed by a reciprocating motion of the spool valve 601, thereby adjusting an oil amount.

With the hydraulic pressure adjustment mechanism 600 according to the sixth embodiment to which the electromagnetic actuators according to the first to fifth embodiments are applied, the effects described in the above-mentioned first to fifth embodiments are attained. Therefore, with the hydraulic pressure adjustment mechanism 600 according to the sixth embodiment, the amount of oil flowing through a flow passage can be precisely controlled.

As the stator 1 and the movable element 3 for the electromagnetic actuators according to the first to fifth embodiments, those having a cylindrical shape are used. However, a center axis is provided even in a case of a shape other than the cylindrical shape, and hence the electromagnetic actuator according to the invention of the present application attains a similar effect. Moreover, as the movable element 3 for the electromagnetic actuator according to the first to fourth embodiments, the movable element 3 having a cylindrical hollow portion on an inner side thereof is used. However, a center axis is provided even in a case of a shape having no hollow portion, and hence the electromagnetic actuator according to the invention of the present application attains a similar effect.

The present invention is not limited to the forms described in Embodiments 1 to 6, within the scope of claims, the embodiments can freely be combined, and each of the embodiments can appropriately be modified or omitted.

REFERENCE SIGNS LIST 1 stator
2 coil
3 movable element
4 spring
11 core portion
12 protrusion portion
21 magnetic flux generated through energization of coil
22 magnetic flux generated by the permanent magnet
30 center axis
31 movable element core
32 permanent magnet
100, 200, 300, 400, 500 electromagnetic actuator
501 drive shaft
600 hydraulic pressure adjustment mechanism
601 spool valve
602 sleeve
602a, 602b, 602c, 602d port

The invention claimed is:

1. An electromagnetic actuator, comprising:
a stator, which has a first surface at one end in an axial direction and a second surface at another end in the axial direction, and is made of a first soft magnetic material having a tubular space formed in the axial direction; and
a movable element, which is disposed in the tubular space, and is configured to move along the axial direction,
wherein the stator includes:
a coil, which is provided in the stator, and is configured to excite the stator;
a core portion, which is arranged between the coil and the movable element, and extends from a first surface side of the stator towards a second surface side of the stator; and
a protrusion portion, which is arranged between the coil and the movable element, and which protrudes from the second surface side of the stator towards the first surface side of the stator,
wherein the movable element includes a movable element core made of a second soft magnetic material and a permanent magnet, and at least one of a radially inner side and a radially outer side of the permanent magnet is covered by the movable element core,
wherein the permanent magnet of the movable element is magnetized so that a first magnetic flux, which is generated from the permanent magnet and flows from a second end surface of the permanent magnet through the movable element core to a first end surface of the permanent magnet opposite the second end surface without flowing through the stator, flows in the axial direction in a first direction opposite to a second direction of a second magnetic flux which is generated and flows, when the coil is energized, in the movable element core, through a portion of the movable element core located in a radial direction from the permanent magnet, and
wherein, when the coil is energized, the movable element moves from a first position where the second end surface of the permanent magnet that faces the second surface side of the stator does not extend past an end surface of the core portion of the stator that also faces the second surface side of the stator, in the second direction to a second position where the second end surface of the permanent magnet extends past the end surface of the core portion of the stator.

2. The electromagnetic actuator according to claim 1, wherein the permanent magnet is annularly provided in the movable element core.

3. The electromagnetic actuator according to claim 1, wherein, when the coil is not energized, the second end surface of the permanent magnet is located where the second end surface of the permanent magnet does not extend past the end surface of the core portion of the stator.

4. The electromagnetic actuator according to claim 1,
wherein a surface of the permanent magnet on an inner peripheral side is covered by the movable element core, and
wherein an outer peripheral surface of the permanent magnet is exposed to an outside of the movable element and forms a part of an outer side surface of the movable element.

5. The electromagnetic actuator according to claim 1,
wherein a surface of the permanent magnet on an outer peripheral side is covered by the movable element core, and
wherein an inner peripheral surface of the permanent magnet is exposed to a hollow portion of the movable element and forms a part of an inner side surface of the movable element.

6. The electromagnetic actuator according to claim 1, wherein both end surfaces in the axial direction and inner and outer peripheral surfaces of the permanent magnet are covered by the movable element core.

7. The electromagnetic actuator according to claim 1, wherein the permanent magnet is divided into a plurality of segments, and is annularly provided in the movable element.

8. The electromagnetic actuator according to claim 1,
wherein the first end surface of the permanent magnet on the first surface side of the stator in the axial direction, and inner and outer peripheral surfaces of the permanent magnet, are covered by the movable element core, and
wherein the second end surface of the permanent magnet on the second surface side of the stator in the axial direction are covered by a drive shaft which is configured to move integrally with the movable element.

9. The electromagnetic actuator according to claim 4, wherein both of the first and second end surfaces of the permanent magnet in the axial direction are covered by the movable element core.

10. A hydraulic pressure adjustment mechanism, comprising:
an electromagnetic actuator including:
a stator, which has a first surface at one end in an axial direction and a second surface at another end in the axial direction, and is made of a first soft magnetic material having a tubular space formed in the axial direction; and
a movable element, which is disposed in the tubular space, and is configured to move along the axial direction,
wherein the stator has:
a coil, which is provided in the stator, and is configured to excite the stator, a core portion, which is arranged between the coil and the movable element, and extends from a first surface side of the stator towards a second surface side of the stator, and a protrusion portion, which is arranged between the coil and the movable element and which protrudes from the second surface side of the stator towards the first surface side of the stator;

a spool valve configured to reciprocate in a sleeve by the movable element of the electromagnetic actuator; and a plurality of ports, which are formed in the sleeve, and is configured to open and close along with a reciprocating motion of the spool valve, wherein the movable element includes a movable element core made of a second soft magnetic material and a permanent magnet and at least one of a radially inner side and a radially outer side of the permanent magnet is covered by the movable element core, wherein the permanent magnet of the movable element is magnetized so that first magnetic flux, which is generated from the permanent magnet and flows from a second end surface of the permanent magnet through the movable element core to a first end surface of the permanent magnet opposite the second end surface without flowing through the stator, flows in the axial direction in a first direction opposite to a second direction of a second magnetic flux which is generated and flows, when the coil is energized, in the movable element core, through a portion of the movable element core located in a radial direction from the permanent magnet, and, wherein, when the coil is energized, the movable element moves from a first position where the second end surface of the permanent magnet that faces the second surface side of the stator does not extend past an end surface of the core portion of the stator that also faces the second surface side of the stator, in the second direction to a second position where the second end surface of the permanent magnet extends past the end surface of the core portion of the stator.

11. The electromagnetic actuator according to claim 1, wherein the first soft magnetic material and the second soft magnetic material are the same soft magnetic material.

12. The electromagnetic actuator according to claim 1, wherein, in the axial direction, the permanent magnet is closer to a second end surface of the movable element core that faces the second surface side of the stator than the permanent magnet is to a first end surface of the movable element core opposite the second end surface of the movable element core.

13. The electromagnetic actuator according to claim 1, further comprising an annular gap between the protrusion portion and the end surface of the core portion that faces the second surface side of the stator.

14. The electromagnetic actuator according to claim 1, wherein the first magnetic flux and the second magnetic flux flow through the movable element core on a same side of the permanent magnet in the radial direction.

15. The electromagnetic actuator according to claim 1, wherein the second position both the first end surface and the second end surface of the permanent magnet extend past the end surface of the core portion of the stator.

16. The hydraulic pressure adjustment mechanism according to claim 10, wherein the permanent magnet is annularly provided in the movable element core.

17. The hydraulic pressure adjustment mechanism according to claim 10, wherein, when the coil is not energized, the second end surface of the permanent magnet is located at the first position where the second end surface of the permanent magnet does not extend past the end surface of the core portion of the stator.

18. The hydraulic pressure adjustment mechanism according to claim 10, wherein, in the axial direction, the permanent magnet is closer to a second end surface of the movable element core that faces the second surface side of the stator than the permanent magnet is to a first end surface of the movable element core opposite the second end surface of the movable element core.

19. The hydraulic pressure adjustment mechanism according to claim 10, wherein the electromagnetic actuator further includes an annular gap between the protrusion portion and the end surface of the core portion that faces the second surface side of the stator.

20. The hydraulic pressure adjustment mechanism according to claim 10, wherein the first magnetic flux and the second magnetic flux flow through the movable element core on a same side of the permanent magnet in the radial direction.

* * * * *